United States Patent
Huang

(10) Patent No.: US 7,537,233 B2
(45) Date of Patent: May 26, 2009

(54) VEHICLE HAVING A SEPARATION UNIT TO PREVENT INTERFERING MOVEMENTS BETWEEN TWO LEGS OF A RIDER

(75) Inventor: Toshi Huang, Taichung Hsien (TW)

(73) Assignee: Gomier Manufacturing Co., Ltd., Taichung Hsien (TW)

(*) Notice: Subject to any disclaimer, the term of this patent is extended or adjusted under 35 U.S.C. 154(b) by 504 days.

(21) Appl. No.: 11/430,543

(22) Filed: May 9, 2006

(65) Prior Publication Data
US 2007/0262559 A1    Nov. 15, 2007

(51) Int. Cl.
*B62K 13/00*    (2006.01)
(52) U.S. Cl. ............... 280/288.4; 280/304.4; 280/282; 297/195.12
(58) Field of Classification Search .............. 280/288.4, 280/304.3, 304.4; 297/195.12
See application file for complete search history.

(56) References Cited

U.S. PATENT DOCUMENTS

| 620,688 | A | * | 3/1899 | Wood | 297/373 |
|---|---|---|---|---|---|
| 3,113,785 | A | * | 12/1963 | Bohnenkamp | 280/7.15 |
| 4,038,935 | A | * | 8/1977 | Margiloff | 116/35 R |
| 4,978,167 | A | * | 12/1990 | Harvey | 297/215.13 |
| 5,149,112 | A | * | 9/1992 | Nauman et al. | 280/7.11 |
| 5,383,677 | A | * | 1/1995 | Thomas et al. | 280/288.4 |
| 6,050,584 | A | * | 4/2000 | Sibson | 280/283 |
| 6,471,232 | B2 | * | 10/2002 | Huang | 280/304.5 |
| 6,503,019 | B1 | * | 1/2003 | Wang | 403/109.1 |
| 6,602,015 | B1 | * | 8/2003 | Evans et al. | 403/109.1 |
| 6,616,224 | B2 | * | 9/2003 | Tsuge | 297/195.12 |
| 6,631,948 | B1 | * | 10/2003 | Tsuge | 297/195.12 |
| 7,331,595 | B2 | * | 2/2008 | Ray | 280/288.4 |
| 2002/0101100 | A1 | * | 8/2002 | Tsuge | 297/195.12 |

* cited by examiner

*Primary Examiner*—Kevin Hurley
(74) *Attorney, Agent, or Firm*—Christensen O'Connor Johnson Kindness PLLC

(57) ABSTRACT

A vehicle includes a frame, a saddle seat, and a separation unit. The frame includes a seat support and a pedal assembly adapted to be operated by two legs of a rider. The saddle seat is mounted on the seat support above the pedal assembly. The separation unit is adapted to prevent interfering movements between the two legs of the rider. The separation unit is connected to the seat support, and is disposed in front of the saddle seat and above the pedal assembly.

4 Claims, 5 Drawing Sheets

VEHICLE HAVING A SEPARATION UNIT TO PREVENT INTERFERING MOVEMENTS BETWEEN TWO LEGS OF A RIDER

BACKGROUND OF THE INVENTION

1. Field of the Invention

The invention relates to a vehicle, more particularly to a vehicle provided with a separation unit to prevent interfering movements between legs of a rider who is unable to properly control movements of his/her legs during riding.

2. Description of the Related Art

Referring to FIG. 1, a conventional vehicle 1 is shown to include a frame 11 having a seat tube 111, a saddle seat 12 mounted on the seat tube 111, a front wheel 13 and two spaced-apart rear wheels 14 mounted at front and rear ends of the frame 11 and disposed to roll on a ground surface, and a pedal assembly 15 operable by two legs of the rider to drive rotation of the rear wheels 14.

The vehicle 1 as illustrated is generally adapted for use by a handicapped rider, and the saddle seat 12 is usually mounted at a relatively low position. As such, the legs of the rider may interfere with each other during pedaling (i.e., the knee of one leg may rub against the thigh of the other leg). This situation intensifies especially for a handicapped rider (such as a person suffering from brain injuries or cerebral palsy) who cannot properly control the movements of his/her legs.

SUMMARY OF THE INVENTION

Therefore, the object of the present invention is to provide a vehicle that is provided with a separation unit to prevent interfering movements between legs of a rider so as to enhance smoothness and safety in riding. The vehicle can also be used for rehabilitation purposes.

Accordingly, the vehicle of the present invention includes a frame, a saddle seat, and a separation unit. The frame includes a seat support and a pedal assembly adapted to be operated by two legs of a rider. The saddle seat is mounted on the seat support above the pedal assembly. The separation unit is adapted to prevent interfering movements between the two legs of the rider. The separation unit is connected to the seat support, and is disposed in front of the saddle seat and above the pedal assembly.

BRIEF DESCRIPTION OF THE DRAWINGS

Other features and advantages of the present invention will be come apparent in the following detailed description of the preferred embodiment with reference to the accompanying drawings, of which.

DETAILED DESCRIPTION OF THE PREFERRED EMBODIMENT

Figure 1:
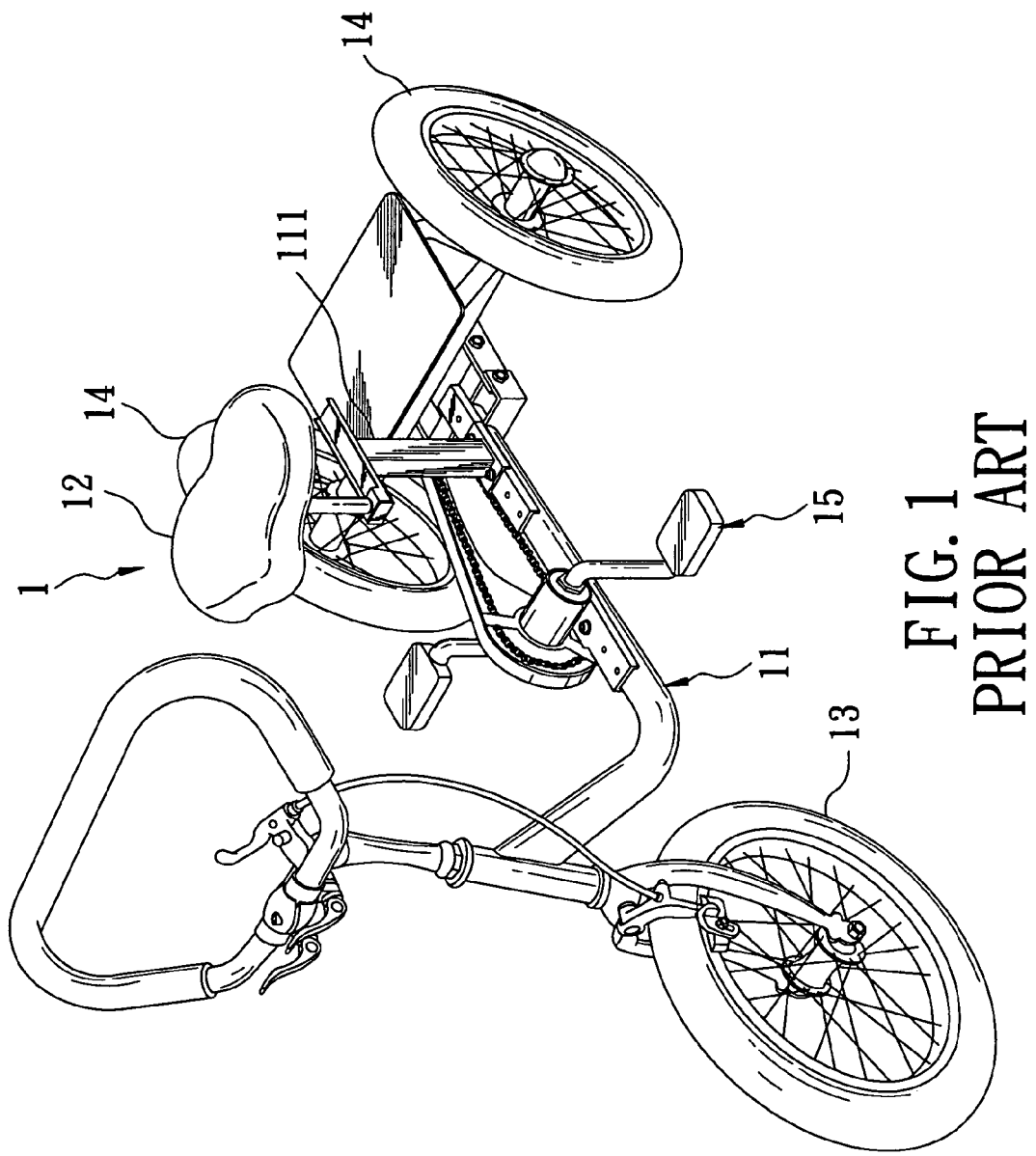
FIG. 1 is an assembled perspective view of a conventional vehicle for the handicapped.
Figure 2:
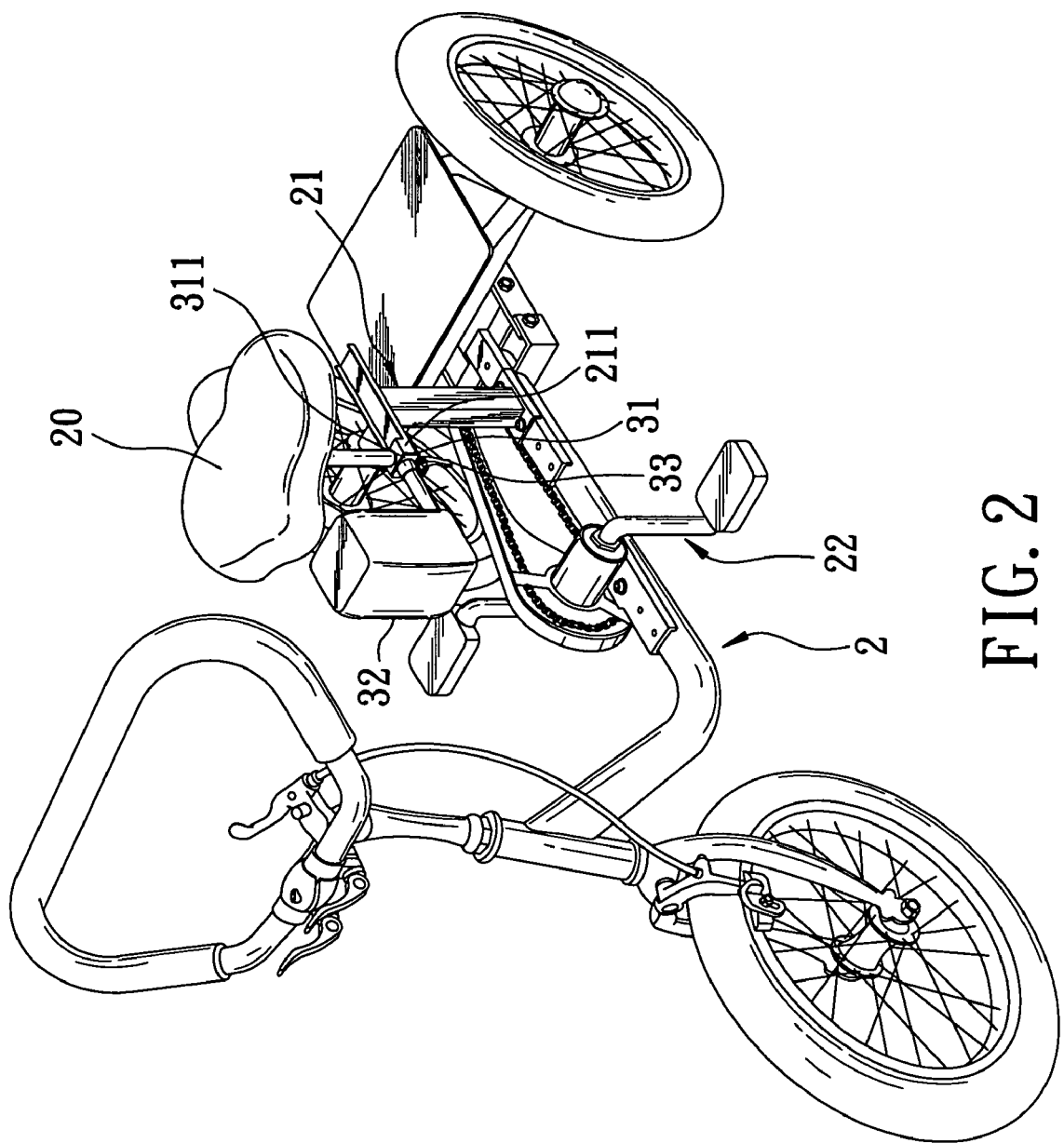
FIG. 2 is an assembled perspective view of the preferred embodiment of a vehicle according to the present invention.
Figure 3:
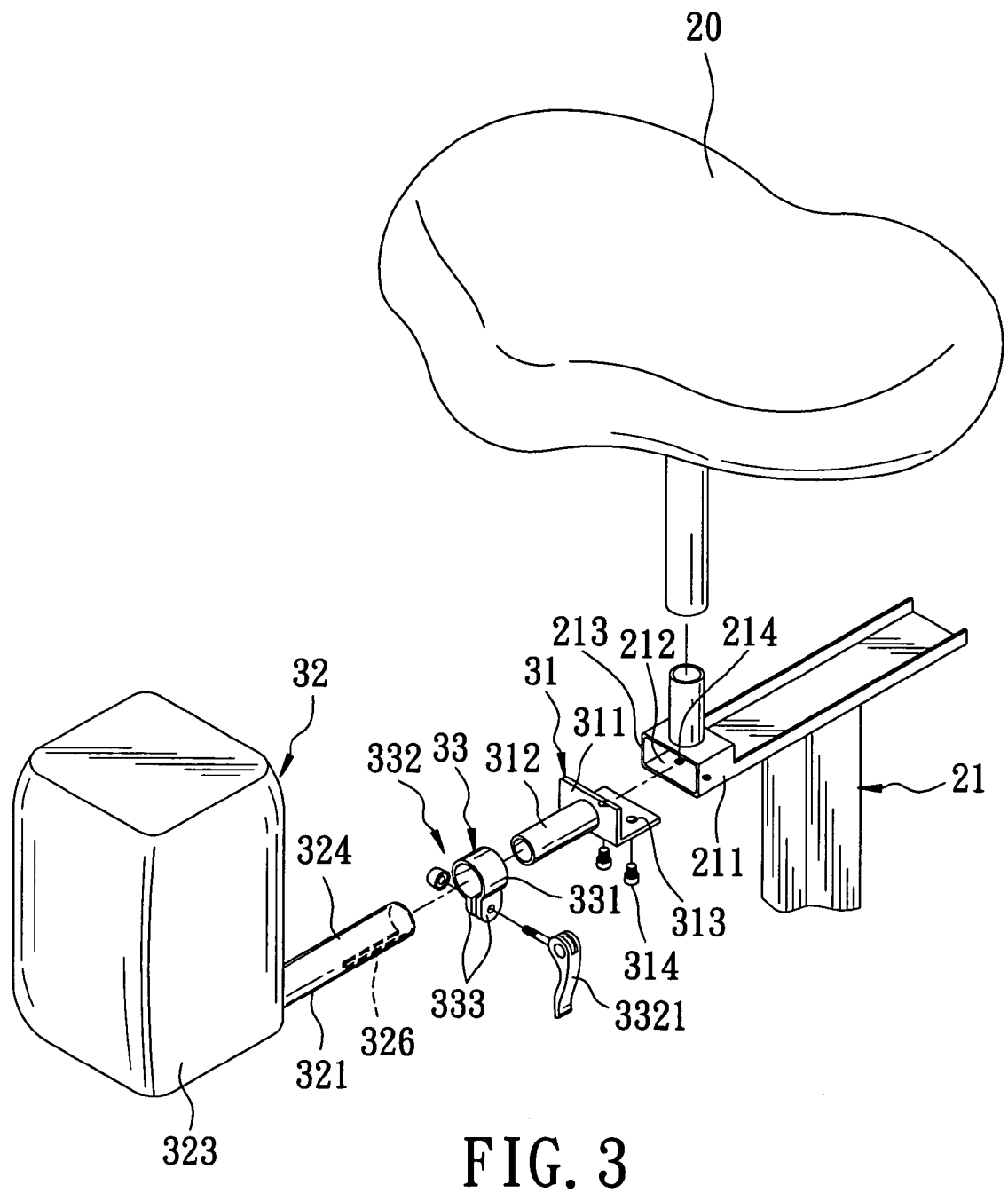
FIG. 3 is a fragmentary exploded perspective view of the preferred embodiment in part.

Referring to FIGS. 2 to 5, the preferred embodiment of a vehicle according to the present invention is shown to include a frame 2, a saddle seat 20, a separation unit 32, and a connecting unit 31.

The frame 2 includes a seat support 21, and a pedal assembly 22 adapted to be operated by two legs of a rider.

The saddle seat 20 is mounted on the seat support 21 above the pedal assembly 22.

The separation unit 32 is adapted to prevent interfering movements between the two legs of the rider, is connected to the seat support 21, and is disposed in front of the saddle seat 20 and above the pedal assembly 22. The separation unit 32 is adjustable in position relative to the saddle seat 20.

Figure 5:
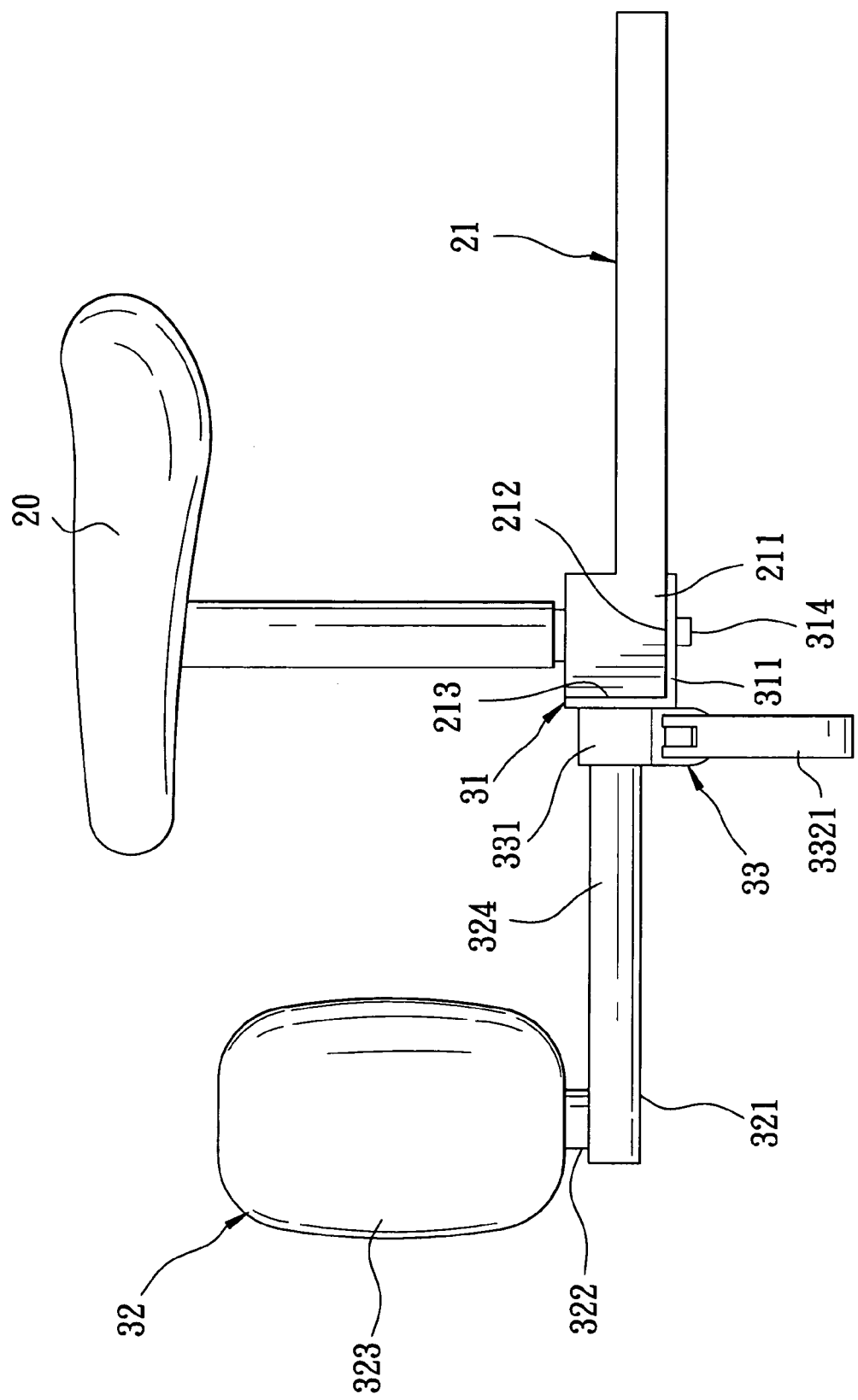
FIG. 5 is a side view of the preferred embodiment in part.

The connecting unit 31 is connected between the seat support 21 and the separation unit 32. The connecting unit 31 includes a connecting tube 312 projecting forwardly from the seat support 21, and a fixing plate 311 secured to the seat support 21 and connected to the connecting tube 312. In this embodiment, the seat support 21 includes a tubular coupling portion 211 that has a rectangular cross-section and that has a bottom wall 212 formed with a plurality of screw holes 214, and a front open end 213. The fixing plate 311 has an L-shaped cross section, and has a vertical part and a horizontal part. The vertical part abuts against the front open end 213 of the coupling portion 211. The horizontal part is formed with a plurality of screw holes 313. A plurality of screw fasteners 314 are extended through the screw holes 214, 313 to thereby lock the connecting unit 31 tightly to the seat support 21, as best shown in FIG. 5.

The separation unit 32 includes a separation block 323 made of a soft material, and a sleeve tube 321 sleeved around the connecting tube 312 and having a forwardly and upwardly extending portion 322 (see FIG. 5) to hold the separation block 323 that is wrapped there around. The sleeve tube 321 has a tube wall 324 which extends around the connecting tube 312, which is movable axially and angularly relative to the connecting tube 312, and which has an axially extending slit 326.

The vehicle further comprises a locking unit 33 to prevent the tube wall 324 of the separation unit 32 from moving relative to the connecting tube 312. The locking unit 33 includes a tubular clamp 331 sleeved onto the tube wall 324, and a tightening member 332. The tubular clamp 331 has two angularly spaced apart and axially extending tabs 333, and is split axially between the tabs 333. The tightening member 332 is operable to hold tightly the tabs 333 together. In this embodiment, the tightening member 332 includes a lever 3321 and is of a quick release type that permits quick assembly and detachment of the sleeve tube 321 to and from the connecting tube 312 so that quick adjustment of a distance between the separation unit 32 and the seat support 21 can be performed through the tightening member 332. As the construction of the tightening member 332 is known, details thereof are not provided herein.

Figure 4:
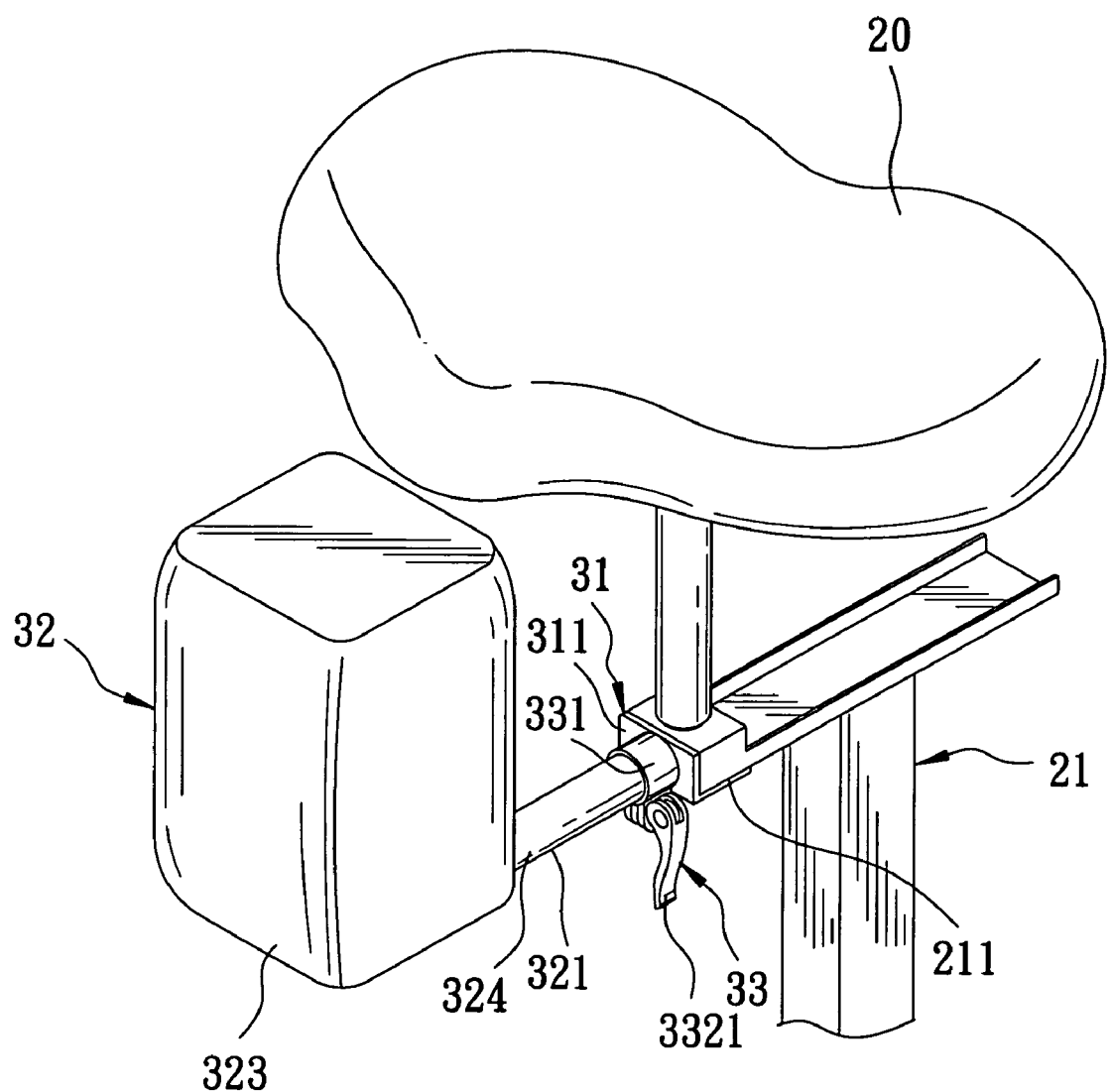
FIG. 4 is a fragmentary assembled perspective view of the preferred embodiment in part.

During assembly, the fixing plate 311 of the connecting unit 31 is first secured to the coupling portion 211 of the seat support 21 using the screw fasteners 314. Then, the tubular clamp 331 of the locking unit 33 is sleeved around the sleeve tube 321 of the separation unit 32. Subsequently, the sleeve tube 321 is sleeved on the connecting tube 312 such that the connecting tube 312 is received within the sleeve wall 324. Finally, the tightening member 332 of the locking unit 33 is attached to the tabs 333. By operating the lever 3321, the cross-section of the tubular clamp 331 can be reduced so that the tube wall 324 is pressed against the connecting tube 312, thereby preventing relative movement and rotation between the sleeve tube 321 and the connecting tube 312. Thus, the separation unit 32 can be firmly secured to the seat support 21 of the vehicle, as best shown in FIG. 4.

In sum, for a handicapped rider who cannot properly control movement of his/her legs, the separation unit 32 of the present invention enables a forced separation of the legs of the handicapped rider to prevent rubbing or bumping of the legs against each other during riding, thereby enhancing riding safety. Furthermore, the position of the separation block 323 may be adjusted to accommodate users of different sizes. In addition, the vehicle of the present invention can be adapted for use as means of rehabilitation for handicapped riders, such as riders suffering from brain injuries or cerebral palsy.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A vehicle comprising:
    a frame including a seat support and a pedal assembly;
    a saddle seat mounted on said seat support above said pedal assembly;
    a separation unit adapted to prevent interfering movements between two legs of a rider, said separation unit being disposed in front of said saddle seat and above said pedal assembly, and said separation unit being adjustable in position relative to said saddle seat; and
    a connecting unit including a connecting tube connected between said seat support and said separation unit, said connecting unit projecting forwardly from said seat support;
    said separation unit including a separation block and a sleeve tube sleeved around said connecting tube and holding said separation block, said sleeve tube having a tube wall extending around said connecting tube and being movable axially and angularly relative to said connecting tube, said tube wall having an axially extending slit;
    said vehicle further comprising a locking unit to prevent said tube wall from moving relative to said connecting tube, said locking unit including a tubular clamp sleeved onto said tube wall, and a tightening member, said tubular clamp having two angularly spaced apart and axially extending tabs and split axially between said tabs, said tightening member being operable to hold tightly said tabs together.

2. The vehicle as claimed in claim 1, wherein said tightening member is of a quick release type.

3. A vehicle, comprising:
    a frame including a seat support and a pedal assembly;
    a saddle seat mounted on said seat support above said pedal assembly;
    a separation unit adapted to prevent interfering movements between two legs of a rider, said separation unit being disposed in front of said saddle seat and above said pedal assembly and adjustable in position relative to said saddle seat; and
    a connecting unit connected between said seat support and said separation unit, said connecting unit including a connecting tube projecting forwardly from said seat support;
    said separation unit including a separation block, and a sleeve tube sleeved around said connecting tube and holding said separation block;
    wherein said connecting unit further includes a fixing plate secured to said seat support and connected to said connecting tube.

4. The vehicle as claimed in claim 3, wherein said fixing plate has an L-shaped cross section and has a vertical part and a horizontal part, said vertical part abutting against a front end of said seat support, said horizontal part being screwed to a bottom of said seat support.

* * * * *